July 24, 1934.  J. C. AYDELOTT  1,967,854
FABRICATED DYNAMO ELECTRIC MACHINE
Filed Aug. 30, 1933  4 Sheets-Sheet 1
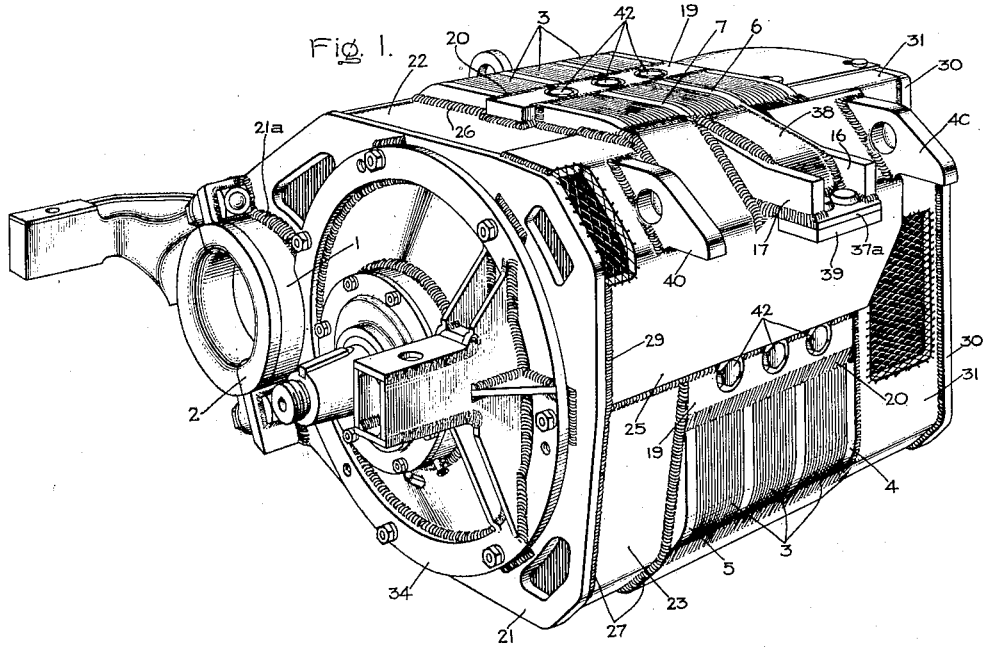
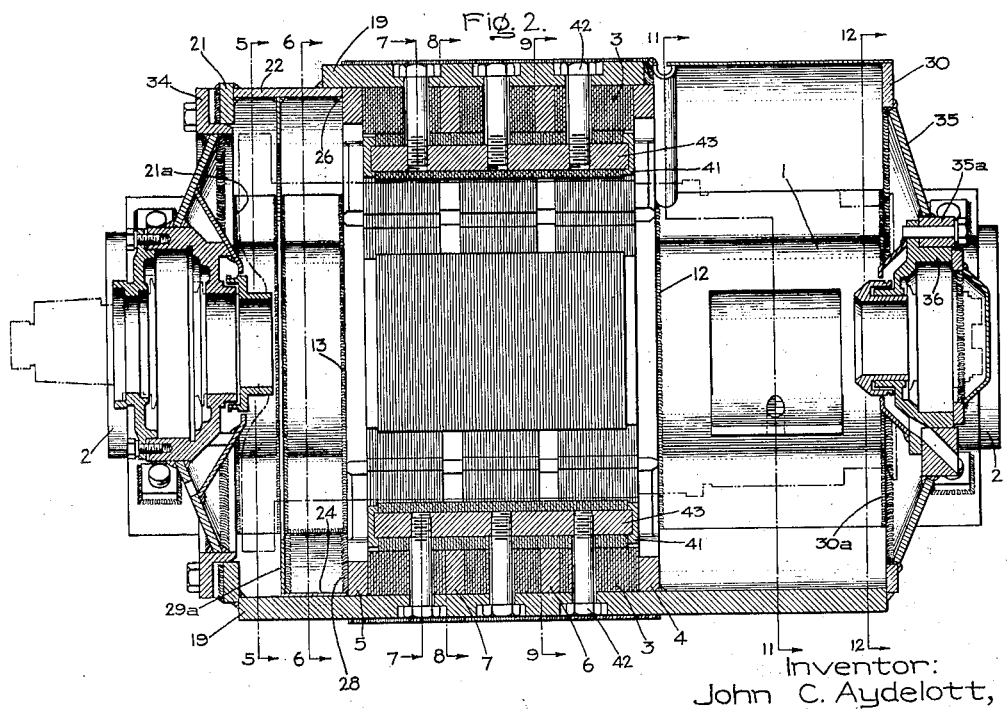
Inventor:
John C. Aydelott,
by Harry E. Dunham
His Attorney.

July 24, 1934. J. C. AYDELOTT 1,967,854
FABRICATED DYNAMO ELECTRIC MACHINE
Filed Aug. 30, 1933 4 Sheets-Sheet 2

Inventor:
John C. Aydelott,
by Harry E. Dunham
His Attorney.

July 24, 1934.   J. C. AYDELOTT   1,967,854
FABRICATED DYNAMO ELECTRIC MACHINE
Filed Aug. 30, 1933   4 Sheets-Sheet 3
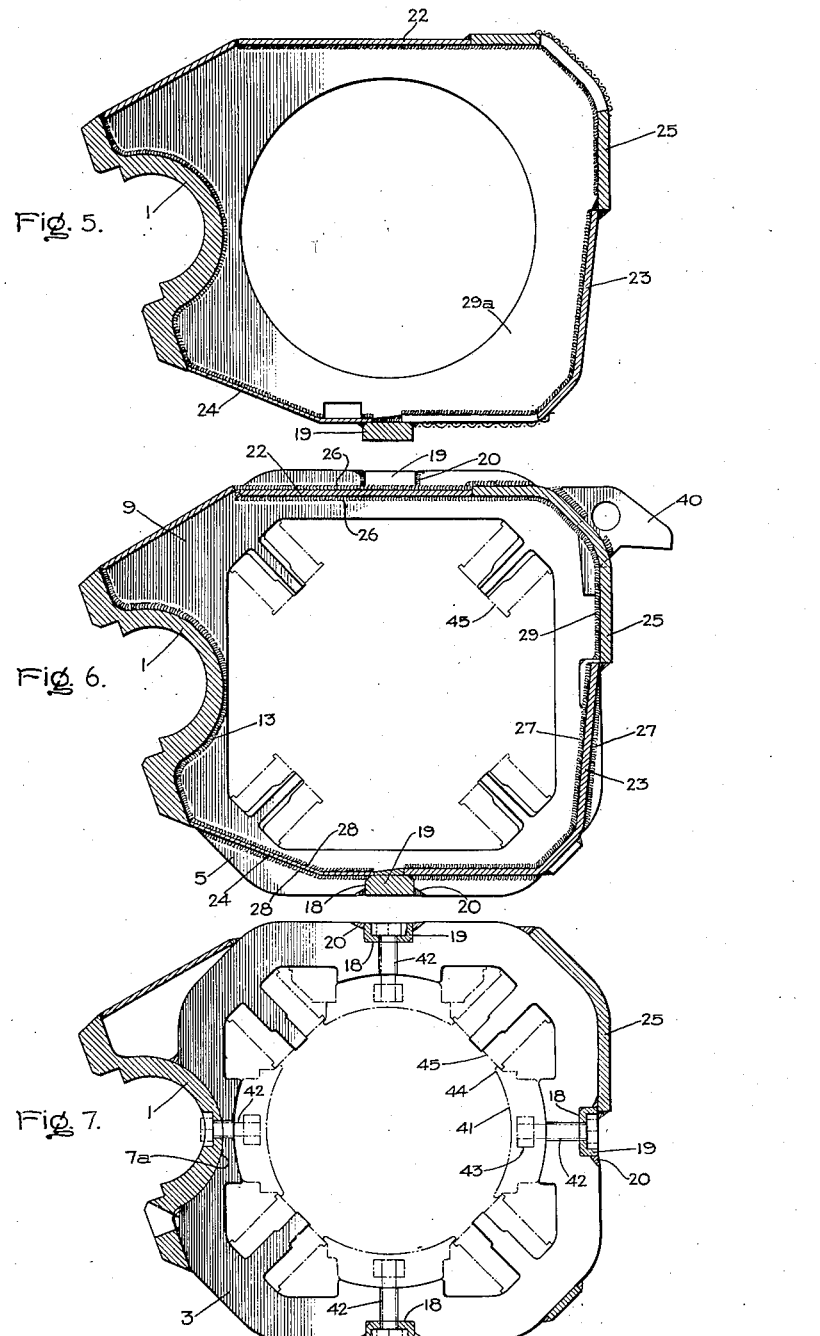
Inventor:
John C. Aydelott,
by Harry E. Dunham
His Attorney.

July 24, 1934.   J. C. AYDELOTT   1,967,854
FABRICATED DYNAMO ELECTRIC MACHINE
Filed Aug. 30, 1933    4 Sheets-Sheet 4
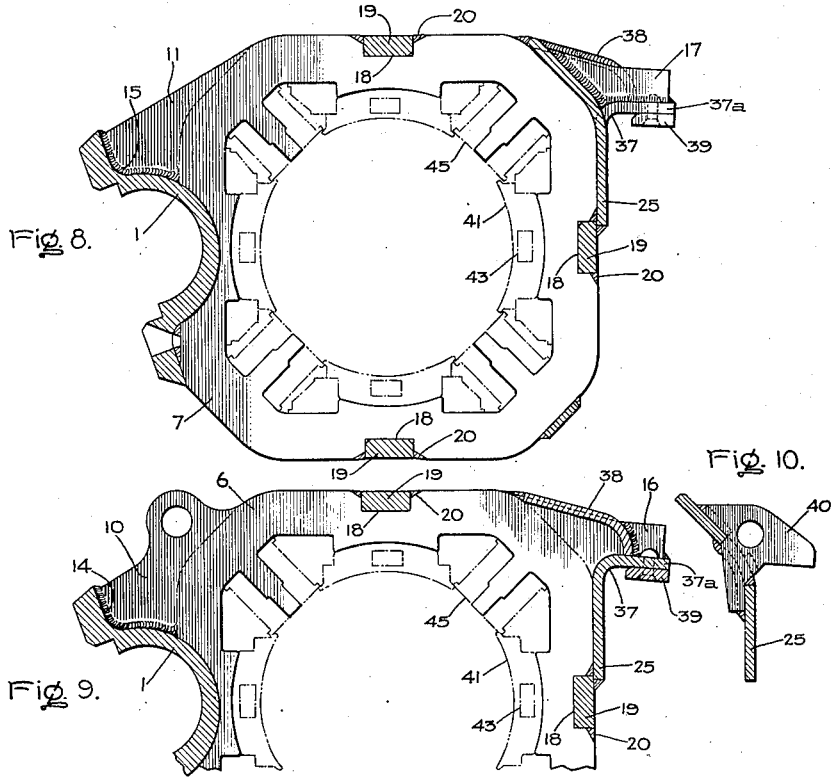
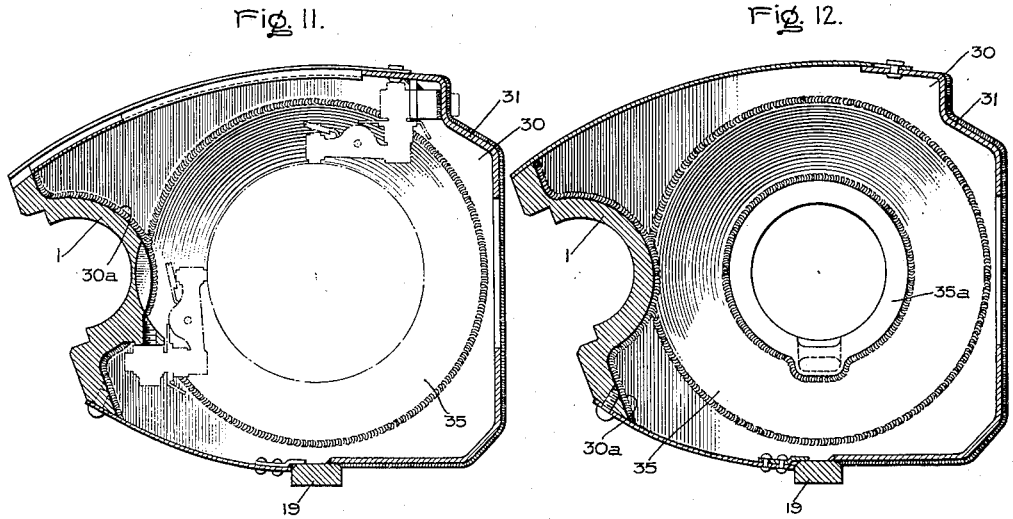
Inventor:
John C. Aydelott,
by Harry E. Dunham
His Attorney.

Patented July 24, 1934

1,967,854

UNITED STATES PATENT OFFICE 1,967,854

FABRICATED DYNAMO-ELECTRIC MACHINE

John C. Aydelott, Erie, Pa., assignor to General Electric Company, a corporation of New York Application August 30, 1933, Serial No. 687,420

18 Claims. (Cl. 172—286)

My invention relates to fabricated dynamo-electric machines.

An object of my invention is to provide a dynamo-electric machine construction in which laminations are secured in assembled relation to a rigid portion of the machine, such as a base or supporting member, by plates interspersed or interleaved in the laminations and attached to the supporting member.

Another object of my invention is to provide a simple fabricated dynamo-electric machine construction which is particularly adapted for mounting on a shaft, such as an axle of a railway car or other vehicle.

Further objects and advantages of my invention will become apparent as the following description proceeds, and the particular features of novelty which characterize my invention will be pointed out in the claims annexed to and forming a part of this specification.

Figure 3:
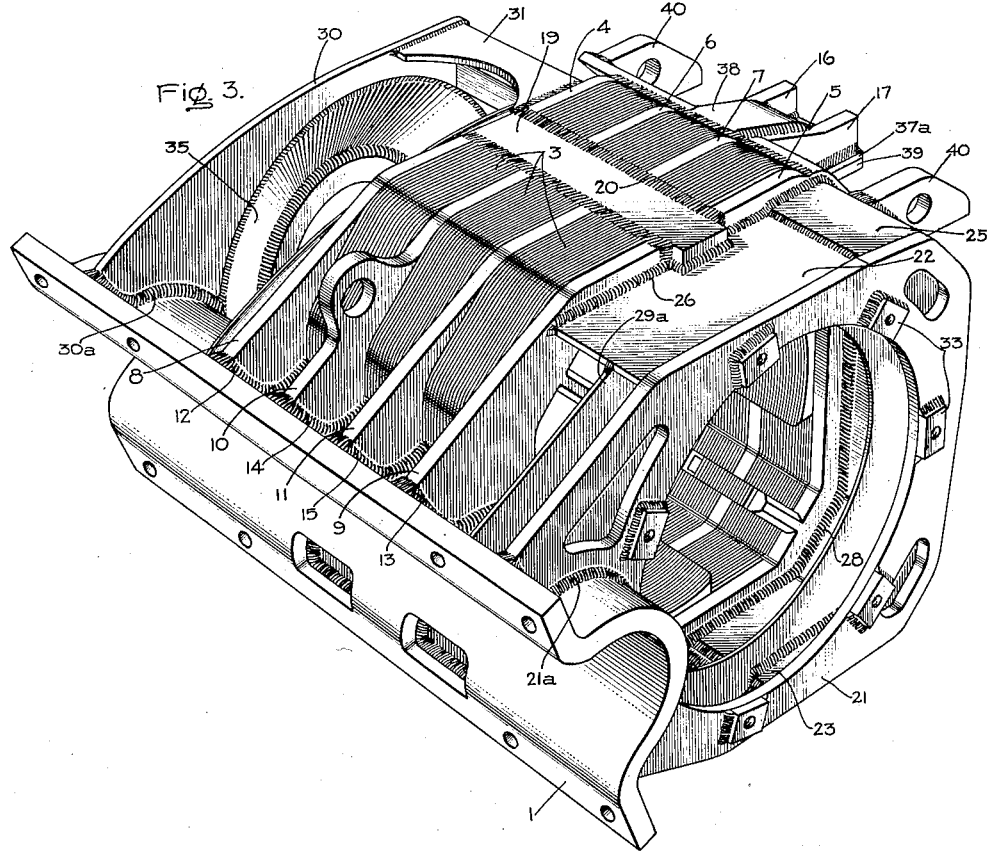
Figure 4:
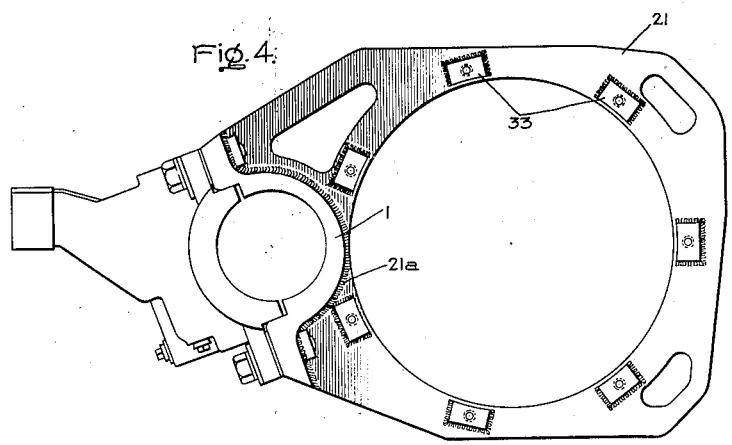

For a better understanding of my invention, reference may be had to the accompanying drawings in which Fig. 1 is a perspective view of an axle-mounted, direct-current motor embodying my invention; Fig. 2 is a vertical sectional view of the motor shown in Fig. 1; Fig. 3 is a perspective view of the magnet frame or stationary member shown in Fig. 1; Fig. 4 is a view of the bearing supporting plate on the pinion end of the machine shown in Fig. 1; Fig. 5 is a sectional view on line 5—5 of Fig. 2; Fig. 6 is a sectional view on line 6—6 of Fig. 2 showing an end plate; Fig. 7 is a sectional view on line 7—7 of Fig. 2 showing the manner of supporting the pole shoes and windings; Fig. 8 is a sectional view on line 8—8 of Fig. 2 showing one of the interspersed plates; Fig. 9 is a fragmentary sectional view on line 9—9 of Fig. 2 showing another interspersed plate; Fig. 10 is a sectional view of the machine adjacent one of the safety lugs welded to a reinforcing plate; Fig. 11 is a section on line 11—11 of Fig. 2; and Fig. 12 is a sectional view on line 12—12 of Fig. 2 showing the end plate at the commutator end.

I have shown my invention as embodied in a fabricated stationary member or magnet frame of an axle-mounted direct-current motor. This stationary member includes a channel-shaped supporting member and bearing housing 1 extending substantially the entire length of the stationary member. The supporting member carries a bearing 2 at either end for mounting the motor on an axle or shaft, such as the axle of a vehicle.

In constructing this stationary member I prefer to clamp an annulus of laminations 3 in any convenient manner between end plates 4 and 5, and provide annular plates 6 and 7 interspersed or interleaved in the laminations. These plates are then welded at their edges to the supporting member and secured together to provide a rigid construction by reinforcing plates or tie bars 19 which are arranged in notches at 18 in the laminations 3 and the plates and which are attached by welds along their edges at 20 to the surface of the laminations and the plates. The clamping pressure is then released and the laminations are firmly secured in assembled relation between the plates and secured to the supporting member. The laminations have their edges presented toward the supporting member and these edges are notched at 7a to conform to the supporting member, as shown in Fig. 7, so that the supporting member forms part of the magnetic circuit of the motor. The plates 4, 5, 6, and 7 conform to the shape of the laminations, except that they have projecting portions 8, 9, 10, and 11 extending from one side of the laminations which conform to the channel-shaped supporting member to which they are attached by welds at 12, 13, 14, and 15. The interspersed plates 6 and 7 also have portions 16 and 17 extending from the side of the stationary member opposite the supporting member 1, which support the motor.

A bearing supporting plate 21 at the pinion end of the motor is welded to the supporting member as shown at 21a in Figs. 1, 3, and 4, and is further supported by transverse members 22, 23, 24, and a reinforcing plate 25 welded at 26, 27, 28, and 29 respectively, to the end plate 5 and the bearing supporting plate. A baffle plate 29a is similarly supported. A bearing supporting plate 30 at the commutator end is welded at 30a to the supporting member 1 and is also secured by transverse member 31 welded to the plate 30 and the end plate 4. The bearing supporting plate 21 carries welded lugs 33 to which an end shield 34 is bolted. The plate 30 carries a concave disk 35 and a ring 35a welded thereto which supports a bearing housing 36.

The reinforcing plate 25 is cut and bent at 37 to form a flange 37a which fits beneath the ends of the portions 16 and 17. The plate 25 is fitted about the portions 16 and 17 of the interspersed plates and welded thereto and to the plates 4, 5, and 21. Parts 16 and 17 are reinforced by a member 38 welded to the projecting portions 16 and 17 and to the bent portion or flange 37a of the reinforcing plate 25. A foot 39 is riveted to the flange 37a. Safety lugs 40 are also welded to the plate 25, as shown in Fig. 10, to support the motor if the main support is broken.

The pole shoes 41 of the main exciting poles are supported by bolts 42 passing through the tie bars 19, the heads of these bolts being countersunk in the bars and the bearing housing 1. The bolts 42 cooperate with a key 43 passing through a slot in the pole shoe 41 to clamp the pole shoe in place. The pole shoe is so shaped that an end 44 bears against the commutating field winding 45 and holds it in position.

While I have shown my invention as applied to an axle-mounted direct-current motor, it is apparent that my invention is generally applicable to structures in which laminations are to be secured directly to a base or other supporting member. I do not, therefore, desire my invention to be limited to the particular construction set forth, and intend in the appended claims to cover all modifications which do not depart from the spirit and scope of my invention.

What I claim as new and desire to secure by Letters Patent of the United States is:

1. A fabricated dynamo-electric machine comprising a supporting member, laminations having their edges presented toward said supporting member, and means including plates interspersed in said laminations and attached at their edges to said supporting member for securing said laminations to said supporting member and for securing said laminations in assembled relation.

2. A fabricated dynamo-electric machine comprising a supporting member, laminations having interspersed plates projecting therefrom, the projecting portions of said plates being attached to said supporting member, and means attached to said plates for securing said laminations in assembled relation.

3. A fabricated stationary member for dynamo-electric machines comprising a supporting member, laminations having interspersed plates projecting therefrom, the projecting portions of said plates being welded to said supporting member, and means including a reinforcing plate extending transversely of said laminations and welded to said plates for securing said laminations to said plates.

4. A fabricated stationary member for dynamo-electric machines comprising a bearing housing for mounting the machine on an axle or the like, laminations arranged with their edges presented toward said bearing housing, plates interspersed in said laminations and projecting therefrom, the projecting portions of said plates being welded to said bearing housing, and means including a reinforcing plate welded to the edges of said plates for securing said laminations between said plates.

5. A fabricated stationary member for dynamo-electric machines comprising a channel-shaped supporting member extending substantially the full length of said machine and forming a bearing housing for mounting the machine on an axle or the like, laminations arranged with their edges presented toward said supporting member, plates interspersed in said laminations and projecting therefrom, the projecting portions of said plates conforming to said supporting member and being welded thereto, and means including a reinforcing plate welded to said plates for securing said laminations between said plates.

6. A fabricated stationary member for dynamo-electric machines comprising a channel-shaped supporting member extending substantially the full length of said machine and forming a bearing housing for mounting the machine on an axle or the like, laminations arranged with their edges presented toward said supporting member, plates arranged at each end of said laminations and interspersed therein, said plates projecting from said laminations and being welded to said supporting member, means for securing said laminations between said plates, and bearing supporting plates spaced from the ends of said laminations and attached by welding to said supporting member and to said plates at the ends of said laminations respectively.

7. A fabricated stationary member for dynamo-electric machines comprising a channel-shaped supporting member extending substantially the full length of said machine and forming a bearing housing for mounting said machine on an axle or the like, laminations arranged with their edges presented toward said supporting member, plates at each end of said laminations and interspersed therein, said plates projecting from said laminations and being welded to said supporting member, a bearing supporting plate spaced from the end of said laminations and welded to said supporting member, and a reinforcing plate welded to all of said plates.

8. A fabricated stationary member for dynamo-electric machines comprising a channel-shaped supporting member extending substantially the full length of said machine and forming a bearing housing for mounting said machine on an axle or the like, laminations arranged with their edges presented toward said supporting member, plates at each end of said laminations and interspersed therein, said plates projecting from said laminations and being welded to said supporting member, means for securing said laminations between said plates, a bearing supporting plate spaced from the end of said laminations and welded to said supporting member, and a reinforcing plate welded to all of said plates for reinforcing said machine.

9. A fabricated dynamo-electric machine comprising a supporting member, laminations having their edges presented toward said supporting member, and means including plates interspersed in said laminations and attached at their edges to said supporting member for securing said laminations to said supporting member, said plates having projections extending from said laminations opposite said supporting member for mounting said machine.

10. A fabricated dynamo-electric machine comprising a supporting member, laminations having their edges presented toward said supporting member, means including plates interspersed in said laminations and attached at their edges to said supporting member for securing said laminations to said supporting member, and means including a reinforcing plate opposite said supporting member for mounting said machine and securing said plates together, projections on said interspersed plates extending from said laminations opposite said supporting member, said reinforcing plate being secured to said projections.

11. A fabricated stationary member for dynamo-electric machines comprising a channel-shaped supporting member extending substantially the full length of said machine and forming a bearing housing for mounting said machine on an axle or the like, laminations arranged with their edges presented toward said supporting member, plates interspersed in said laminations and projecting therefrom, the projecting portions of said plates conforming to said supporting member and being welded thereto, said supporting plates having projections extending from said laminations opposite said supporting member for mounting said machine, and means including a reinforcing plate welded to said plates for securing said laminations between said plates.

12. A fabricated stationary member for dynamo-electric machines comprising a channel-shaped supporting member extending substantially the full length of said machine and forming a bearing housing for mounting said machine on an axle or the like, laminations arranged with their edges presented toward said supporting member, plates at the ends of said laminations and interspersed therein, said plates projecting from said laminations and being welded to said supporting member, means for securing said laminations between said plates, a bearing supporting plate spaced from the ends of said laminations and welded to said supporting member, and a reinforcing plate welded to all of said plates for mounting said machine and for reinforcing said stationary member, projections on said interspersed plates extending from said laminations opposite said supporting member, said reinforcing plate being secured to said projections.

13. A fabricated dynamo-electric machine comprising a supporting member, an annulus of laminations having their edges presented toward said supporting member, and means including annular plates interspersed in said laminations and attached at their edges to said supporting member for securing said laminations to said supporting member and for securing said laminations in assembled relation.

14. A fabricated dynamo-electric machine comprising a supporting member, an annulus of laminations having interspersed annular plates projecting therefrom, the projecting portions of said plates being attached to said supporting member, and means attached to said plates for securing said laminations in assembled relation.

15. A fabricated stationary member for dynamo-electric machines comprising a supporting member, laminations arranged with their edges presented toward said supporting member, plates arranged at each end of said laminations and interspersed therein, said plates projecting from said laminations and being attached to said supporting member, means for securing said laminations between said plates, and bearing supporting plates spaced from the ends of said laminations and attached to said supporting member and to said plates at the ends of said laminations respectively.

16. A fabricated dynamo-electric machine comprising laminations having transverse notches therein, plates arranged at each end and interspersed in said laminations, and means including a reinforcing plate arranged in said notches and welded to the surface of said laminations and said plates for holding said laminations in assembled relation.

17. A fabricated stationary member for a dynamo-electric machine comprising a supporting member, laminations having interspersed plates projecting therefrom and transverse notches therein, the projecting portions of said plates being welded to said supporting member, and means including a reinforcing plate arranged in said notches and welded to said plates for securing said laminations to said plates.

18. A fabricated stationary member for a dynamo-electric machine comprising a supporting member, laminations having interspersed plates projecting therefrom and transverse notches therein, the projecting portions of said plates being welded to said supporting member, and means including a reinforcing plate engaging said notches and welded to the surface of said laminations and to said plates for securing said laminations to said plates.

JOHN C. AYDELOTT.